United States Patent
Jaepel et al.

(10) Patent No.: US 7,873,648 B2
(45) Date of Patent: *Jan. 18, 2011

(54) SYSTEM AND METHOD FOR PERSONALIZED PRESENTATION OF WEB PAGES

(75) Inventors: Dieter Jaepel, Richterswil (CH); Juergen Klenk, Groebenzell (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/545,030

(22) Filed: Aug. 20, 2009

(65) Prior Publication Data

US 2009/0307581 A1   Dec. 10, 2009

Related U.S. Application Data

(63) Continuation of application No. 10/471,165, filed as application No. PCT/IB02/00597 on Feb. 27, 2002, now Pat. No. 7,613,685.

(30) Foreign Application Priority Data

Mar. 8, 2001  (EP)  ................................. 01810238

(51) Int. Cl.
   *G06F 7/00*   (2006.01)
   *G06F 17/30*   (2006.01)
(52) U.S. Cl. ..................... 707/758; 707/706; 707/713; 707/722; 707/736; 709/218; 709/220; 709/224
(58) Field of Classification Search ........................ None
   See application file for complete search history.

(56) References Cited

U.S. PATENT DOCUMENTS 5,907,836 A * 5/1999 Sumita et al. ................. 707/2
5,958,008 A   9/1999 Pogrebisky et al.
6,055,542 A * 4/2000 Nielsen et al. .................. 1/1

(Continued)

FOREIGN PATENT DOCUMENTS

EP   1050830 A2   11/2000

OTHER PUBLICATIONS

Ceric, "New Methods and Tools for the World Wide Web Search", Journal of Computing and Information Technology—CIT 8, 2000, 4, pp. 267-276.

(Continued)

*Primary Examiner*—Usmaan Saeed
(74) *Attorney, Agent, or Firm*—Yee & Associates, P.C.; Kenneth R. Corsello

(57) ABSTRACT

A method for presenting to a user electronic documents is described. The documents are stored at one or more network sites which are accessible via a network by a computer system, and are registered with a page filter system. The method comprises the steps of determining needs and/or intentions and/or a field of interest of the user, defining a user specification based on the determined needs and/or intentions and/or a field of interest of the user, determining a subset of the electronic documents comprising only those of the electronic documents which comprise content that has a predetermined relation to the user specification, and using the identified subset to amend the presentation of at least one of the electronic documents to the user.

14 Claims, 9 Drawing Sheets

U.S. PATENT DOCUMENTS

| | | | |
|---|---|---|---|
| 6,374,237 B1 * | 4/2002 | Reese | 707/3 |
| 6,470,383 B1 * | 10/2002 | Leshem et al. | 709/223 |
| 6,480,887 B1 * | 11/2002 | Hayama | 709/217 |
| 6,549,944 B1 * | 4/2003 | Weinberg et al. | 709/224 |
| 6,647,381 B1 | 11/2003 | Li et al. | |
| 6,665,668 B1 | 12/2003 | Sugaya et al. | |
| 6,957,383 B1 | 10/2005 | Smith | |
| 7,035,820 B2 | 4/2006 | Goodwin et al. | |
| 7,143,089 B2 | 11/2006 | Petras et al. | |
| 7,613,685 B2 * | 11/2009 | Jaepel et al. | 1/1 |
| 2001/0029527 A1 | 10/2001 | Goshen | |
| 2004/0153972 A1 * | 8/2004 | Jaepel et al. | 715/530 |
| 2004/0225647 A1 * | 11/2004 | Connelly et al. | 707/3 |
| 2007/0192314 A1 * | 8/2007 | Heggem | 707/5 |
| 2009/0109475 A1 * | 4/2009 | Honda | 358/1.15 |

OTHER PUBLICATIONS

Davies et al., "Knowledge Discovery and Delivery", British Telecommunications Engineering, vol. 17, No. 1, Apr. 1, 1998, pp. 25-35.

Liechti et al., "A Metadata Based Framework for Extracting and Using Web Sites Structures", IEEE International Conference on Florence, Italy Jun. 7-11, 1999, Los Alamitos, CA, USA, IEEE Comput. Soc, US; Jun. 7, 1999, pp. 51-56.

* cited by examiner

SYSTEM AND METHOD FOR PERSONALIZED PRESENTATION OF WEB PAGES

This application is a continuation of application Ser. No. 10/471,165, filed Mar. 19, 2004, status allowed.

The present invention relates to systems and methods for the handling of electronic documents. More particular, the present invention relates to systems and methods for making available electronic documents by taking into account a user's needs or intentions.

BACKGROUND OF THE INVENTION

Networks are growing at a tremendous speed. The world wide web (WWW) is a popular example. Currently, it is rather cumbersome to navigate through these networks, or even through one site of such a network, since the electronic content that is presented on pages (e.g., web pages) or decks (e.g., WAP decks) are published in a fixed structure that is designed to fit all needs. Even if computer systems on the user side were smart enough to know what a user is currently looking for, this would not help to solve this problem, due to the fixed structure of the electronic content and due to the way this content is presented.

There is software that can be used to realize applications where the web content is dynamically created. An example is IBM's WebSphere Application Server software. It allows building and deploying personalized, dynamic web content. Neither the fixed nor the dynamic content structure, however, takes the user's needs and intentions into account.

Users still have to search around a lot and navigate through uninteresting pages before they can successfully locate the desired electronic content (documents), if they are successful at all.

Another well-known problem is that many pages are not well maintained meaning that there are dead links and outdated information. This particular type of problem can be avoided if site management would be taken more seriously, but it is obviously not the user who is browsing the network who can control or influence this.

Yet another problem is that product names and company names are changing which in itself again leads to outdated information and links. It is also problematic when pages are moved or reorganized without updating links that reference these pages.

In most cases, there is no control authority or instance that watches over what is offered on the network. Hardly any editorial reviews are performed and anybody can go public by simply posting electronic content as he likes.

All these problems become more serious as the network grows. The more complex and convoluted the network structure gets, the more difficult it gets to hit those pages that contain information of interest.

There are solutions that try to overcome some of the aspects outlined above. Some pages are for example equipped with a site map that gives a user, once he has reached a particular site, a quick overview of the structure and organization of the respective site. It is a disadvantage of these site maps that they are static in the sense that they are hardly user customizable.

In view of the above, it is possible to formulate the following general design goals for future network generations: (1) enhanced site server functionality (e.g., by improving the software used on the server side); (2) enhanced page behavior; and (3) enhanced site architecture.

The problem with these general design goals is that their realization would involve different entities. A cooperation of these entities, however, is unlikely, since there are diverging interests for some of them. As with many ambitious projects, they are prone to fail.

It is thus an object of the present invention to provide a scheme that improves the navigation inside networks, and more specifically, that improves the identification and retrieval of pages that are considered to be of interest to or useful for the user.

SUMMARY OF THE INVENTION

According to the present invention, a page filter system is employed. Electronic content in the form of pages and/or decks are registered with the page filter system.

The scheme works as follows. A newly created electronic document (e.g., a network page), or an electronic document that has been modified, is registered with a page filter system. The page filter system maintains a record (e.g., a list) of registered electronic documents. A user specification is employed which describes the user's needs and/or intentions and/or the user's field of interest. This user specification is used in order to be able to identify only those electronic documents on the network, in most cases a subset of all registered electronic documents, that are deemed to comprise relevant information. These relevant electronic documents—after having been identified by the page filter system—can be presented or prepared for further processing. The user may for example display the respective electronic document on the server or download it onto his computer system. In addition, the user may want to quickly and easily navigate through these documents.

DESCRIPTION OF THE DRAWINGS

The invention is described in detail below with reference to the following schematic drawings.

DESCRIPTION OF PREFERRED EMBODIMENTS

Before various embodiments of the present invention are described, some of the most frequently used expressions and terms are described or defined.

A network in the present context can be any kind of network. The invention is not limited to large public networks. It can be used on Intranets and the like, as well. Examples of networks are: the Internet, the WWW, campus networks, Intranets, local area networks (LANs), and wide area networks (WANs), just to mention a few examples.

The present invention is applicable to any kind of electronic content that is storable and processable by computer systems. Examples are: text (human-readable as well as machine readable), audio information, images, video streams and other multimedia content (e.g., MP3-files), just to mention a few examples.

In the present description the word 'document' is used to indicate that electronic content is presented in some sort of container or frame. Examples of such containers or frames are files, pages (e.g., http-pages), wml-pages, WAP decks, and the like. All these kind of documents are herein referred to as electronic documents.

Figure 1:
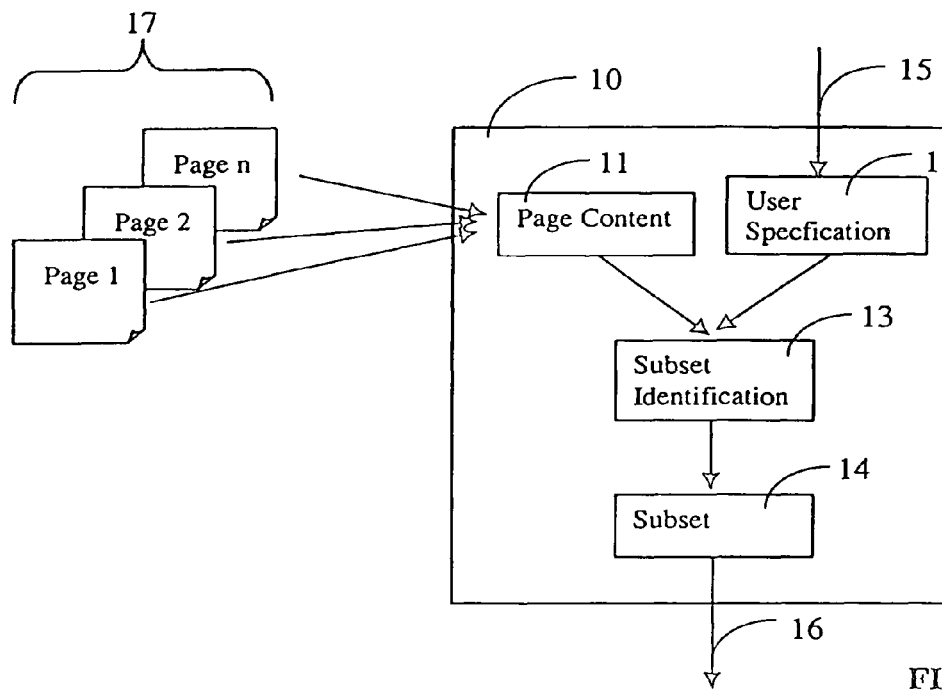
FIG. 1 shows a schematic block diagram of one embodiment, according to the present invention.

A first embodiment of the present invention is described in connection with FIG. 1. As illustrated in this figure, electronic documents 17 (Page 1, Page 2, through Page n) are registered with a page filter system 10. The page filter system 10 serves as a site navigation support system, i.e. it allows the user to access the electronic documents 17 which are then presented to the user. The page filter system 10 is envisaged to personalize this presentation in that it amends the presentation under use of user-specific information in form of a user specification. A typical amendment would be on a page an amended arrangement of links to other pages. Such a rearrangement could take into account preferences of the user such as the preference for certain topics. The more the user proves to have interest in a certain topic, the more links to that topic might be arranged on a page or the more central to the page the link is arranged. The amendment may hence comprise any modification of the electronic documents 17, be it in their content, arrangement, form, visualization, order etc. The amendment will typically be performed in order to facilitate the access to the electronic documents 17 or adapt the content or appearance of the electronic documents 17 to the user respectively the user's needs or desires. This adaptation does not mandatorily need an active role of the user in that the user specifies his desires or needs. Rather the page filter system 10 is equipped with means to define a user specification based on information derived from the analysis of user actions such as keystrokes, the access of documents or files, etc. The computer system used by the user can be equipped to create records of the use of the computer system by the user, e.g. a keystroke history, a network access log file, a site history of the web browser etc. These records could be accessed and used by the page filter system 10. The adaptation takes place in that the registered electronic documents 17 are compared with the user specification and that this comparison leads to a restriction in that a subset of the electronic documents 17 is determined, namely comprising those of the electronic documents 17 that have a predetermined relation to the user specification. An example of such a predetermined relation could be that a specific topic contained in the user specification is found in the content of the electronic documents 17. Another example would be that a topic is not found in the content, or that a specific minimum number of links in the electronic documents 17 are related to a topic from the user specification. The relation hence can be any logical operation that compares one or more pieces of the user specification with one or more peaces or features of the electronic documents 17. The adaptation to the user can be dynamic in that with every action of the user that is recorded the user specification and hence the thereupon dependent subset is recalculated and adapted to the situation after the last action.

The page filter system 10 can be realized as server software, i.e., as a software for execution by a server computer. The fact that these electronic documents 17 are registered with the page filter system 10, is indicated by means of arrows pointing towards the page filter system 10. The page filter system 10 comprises a page content unit 11 that stores information about the content of all electronic documents 17 that are registered with the page filter system 10. A software in the present context means an expression, in any language, code or notation, of a set of instructions intended to cause a device having an information processing capability to perform a particular function.

A user who wants to find information on a network uses a computer system (not illustrated in FIG. 1) to access the network. The present scheme uses knowledge about the user's intentions and/or needs. A user specification 12 is thus employed that describes/represents the user's intentions and/or needs. For this purpose, the page filter system 10 receives or obtains input via an input line 15. Among many other approaches, the user specification 12 can be derived from the user's browsing behavior, click streams, explicit queries, key word lists, or any combination thereof.

The page filter system 10 compares the information about the content of the electronic documents 17, maintained in the page content unit 11, with the user specification 12 in order to find matches. Different algorithms can be used in order to find matching information. This may be done by a Subset Identification unit 13, also referred to as match-making unit 13. The comparison leads to the identification of a subset 14 of the electronic documents which are deemed to be related to the user specification 12. The subset 14 is made available via an output line 16 for further processing.

A second embodiment of the present invention is described in connection with FIG. 2A. As illustrated in this figure, a newly created electronic document 27 (e.g., a network page or an electronic document that has been modified), is registered with the page filter system 20, also referred to as page filter module 20. This can be done by sending a register_me command 31 to the page filter system 20. The page filter system 20 comprises a page content unit 21 that stores information about the content of those pages (e.g., the electronic document 27 in the present example) that have been registered with the page filter system 20.

The registration of the electronic documents 27 can be done in two different ways. Either, a computer 30, e.g., a http-server, on which the electronic document 27 is stored, or by which the electronic document 27 is administered, sends information about the content of the electronic document 27 to the page filter system 20 referred to as page filter registration, $1^{st}$ mode of operation, or the electronic document 27 as a whole is sent to and processed by the page filter system 20, also referred to as page filter registration, $2^{nd}$ mode of operation. The latter approach allows the page filter system 20 to actively extract information from the electronic document 27, whereas according to the first approach the page filter system 20 receives the respective information about the electronic document 27. In both cases, the presence and content of the electronic documents 27 are advertised to the page filter system 20.

The electronic documents 27 may also be registered with the page filter system 20, as follows. The page filter system 20 may scan through the network in order to find and register electronic documents, referred to as passive page filter, also referred to as crawler-mode of operation.

The page filter system 20 may work like a web-crawler or the like. The page filter system 20 may also receive information about electronic documents from agents which explore the network.

Figure 2A:
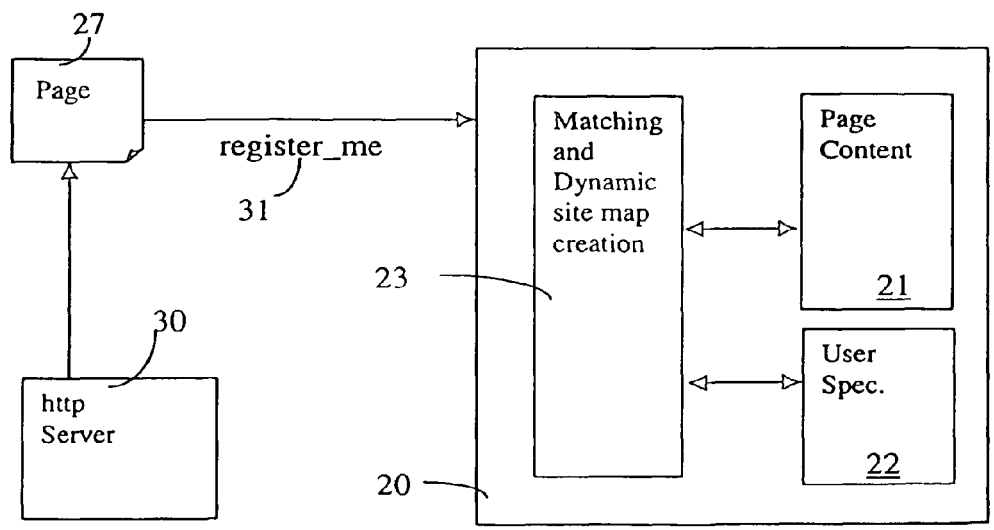
FIG. 2A shows a schematic block diagram of a further embodiment, according to the present invention.
Figure 2B:
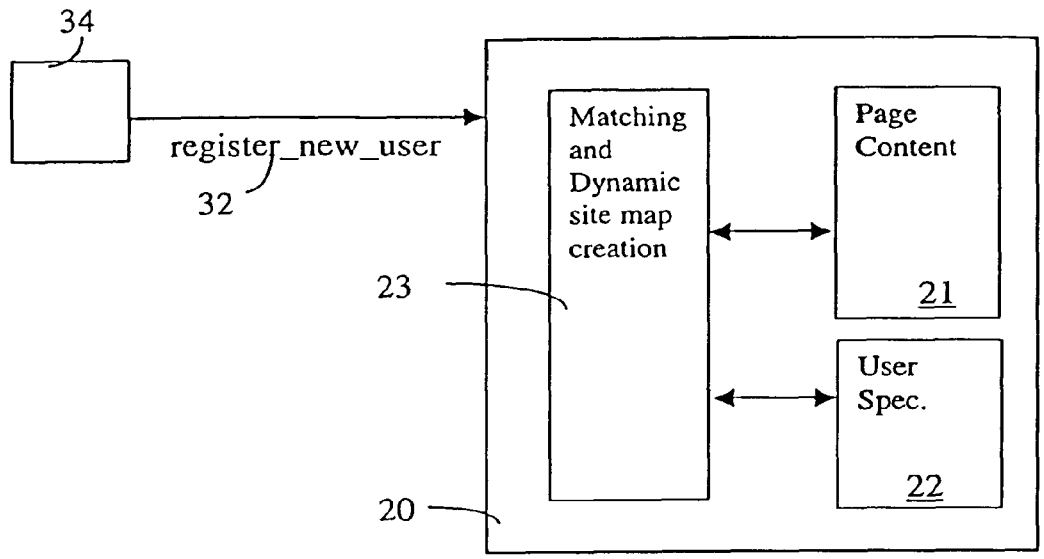
FIG. 2B shows a schematic block diagram of a further embodiment, according to the present invention.
Figure 2C:
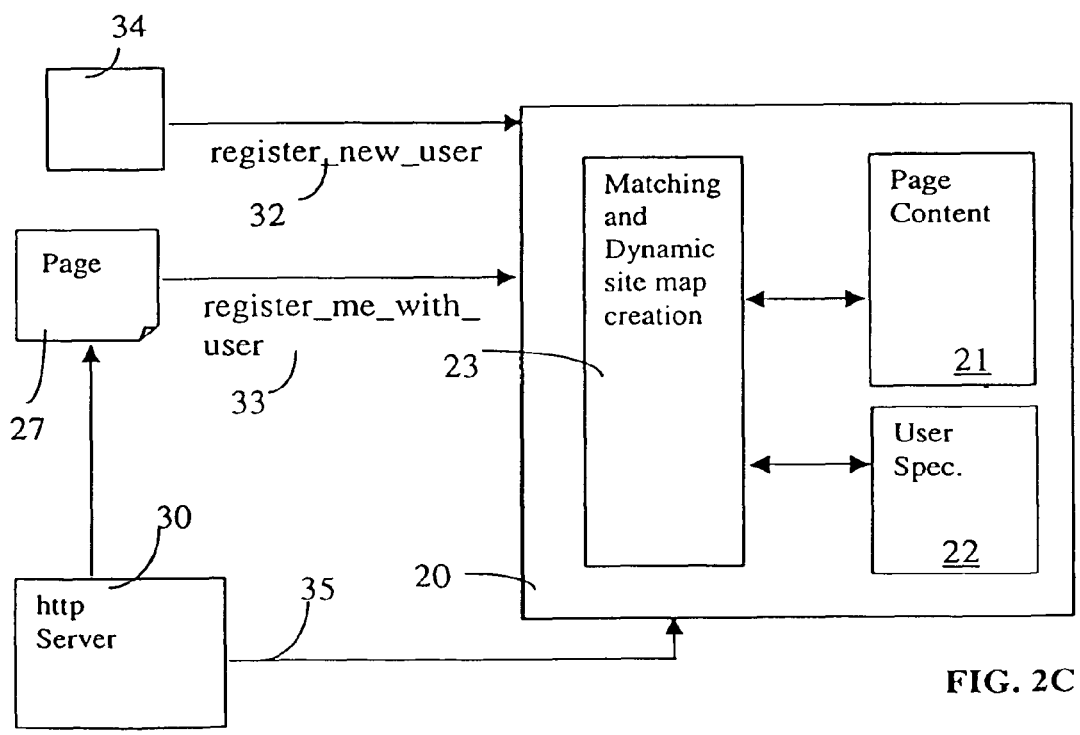
FIG. 2C shows a schematic block diagram of a further embodiment, according to the present invention.

A user who wants to find information on the network uses a computer system (not illustrated in FIGS. 2A-2C). A user specification 22 is being employed that describes/represents the user's intentions and/or needs.

There are many different ways on how to define such a user specification 22. The computer system may for example ask the user to specify his intentions and/or needs. This can be done by entering a few keywords, for example. It is also possible for the computer system to obtain information about the user's intentions and/or needs from past activities, e.g., by analyzing information the user has accessed. In another implementation, the page filter system 20 or some other system in the network may record the user's personal history for the purpose of creating the user specification 22. One may for example use the personal history recorded by the web browser software used on the user's computer system. One may also take into account personalization data of the user.

The latter approach is what is illustrated in FIGS. 2A-2C. The page filter system 20 maintains a record 22 of the user's personal history, herein referred to as user specification 22. The user specification 22 is comparable with the user specification 12, as described in connection with FIG. 1. Preferably, the most recent entries in the history are used in determining the user's current needs and/or intentions and/or field of interest.

The page filter system 20 compares the information about the content of the electronic documents 27, that is maintained in the page content unit 21, with the user specification 22, in order to find matches. Different algorithms can be used to find matching information. Dynamic match-making algorithms are well suited. If the document content and the user specification 22 are stored in semantic networks then topological analyses such as subgraph-matching are also suited. The comparison leads to the identification of a subset of the electronic documents 27 that are deemed to be related to the user specification 22. The subset of the electronic documents 27 is made available for further processing. The subset of the electronic documents 27 may for example be processed in order to generate a dynamic site map. The word "dynamic" is used in the present context to indicate that such a site map automatically varies when the content of the electronic documents 27 changes, when electronic documents 27 are added, or when the user specification 22 changes.

In the present example, the page filter system 20 comprises a match-making unit 23 that performs the matching and the dynamic-site-map creation.

Such a dynamic site map enables the user to quickly access only those electronic documents 27 that are deemed to contain relevant information. By clicking on the links of a dynamic site map the user may arrive immediately at those of the electronic documents 27 that would in a conventional system only be reachable by following a sequence of links. Dead links and useless pages can hence be avoided by the described mechanism. It can be employed in a manner to reduce the need to create links in the first place.

A third embodiment is described referring to FIG. 2B. The user may access the page filter system 20 in order to register with it. In order to do so, he may send a register_new_user command 32 to the page filter system 20. The register_new_user command 32 may be issued by a computer system 34. This command 32 can be used as a trigger to open a new user profile comprising the user's current user specification inside the user specification unit 22. If the user is looking for information on the network, he accesses the page filter system 20 and logs on e.g., by using a password and user identifier. He then can obtain the subset of electronic documents that are deemed to be related to the user's intentions and/or needs, as described above.

Yet another embodiment is described by means of reference to FIG. 2C. The second and/or third embodiment may be modified by adding the following functionality. Web pages, e.g., an electronic document 27, can be individually registered with certain users. For this purpose, the respective server 30 may issue a register_me_with_user command 33. In order for the server 30 to be able to do this, the server 30 should be aware of the user's interests and/or intentions. For this purpose, the server 30 may either maintain its own user record comprising the user's current specification or the server 30 may be able to access the user specification 22 at the page filter system 20 via a link 35.

The page content unit 21, the user specification unit 22 and the match-making unit 23 can be integrated together with a processing unit, that is designed for running the page content unit 21, the user specification unit 22 and the match-making unit 23, further together with a network interface for accessing the electronic documents 27 and a memory for storing the user specification 22 into a computer system. The memory is then connected to the processing unit which is connected to the network interface which is connected to the network. The page content unit 21, the user specification unit 22 and the match-making unit 23 are all connected to the processing unit.

Figure 3:
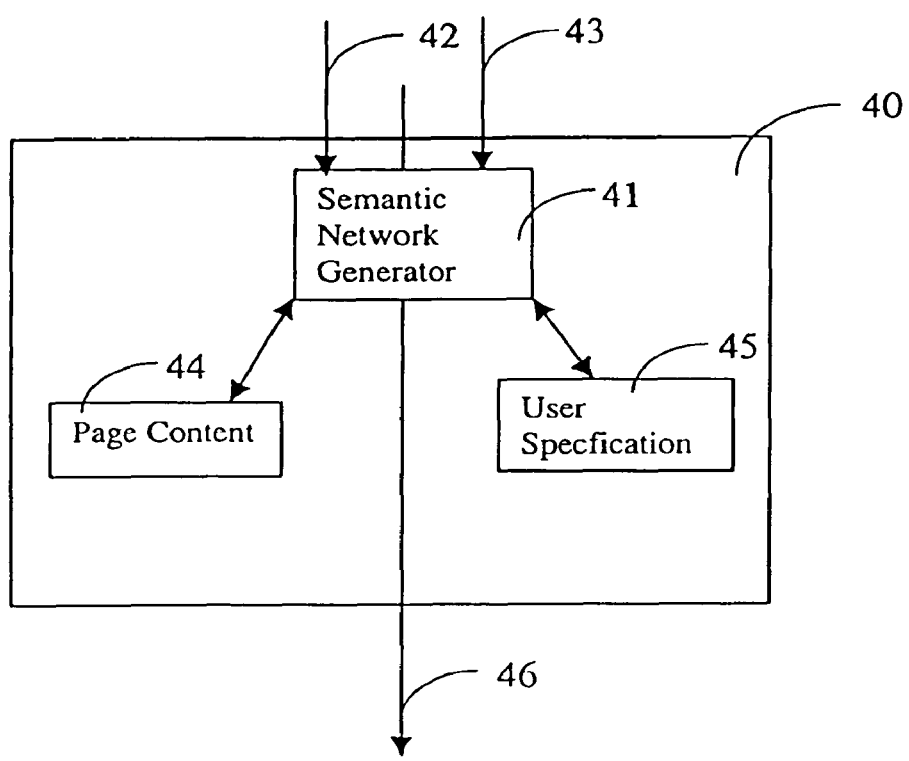
FIG. 3 shows a schematic block diagram of a further embodiment, according to the present invention.

In yet another embodiment, the page filter system 40 may comprise a semantic network generator 41, also called semantic processor, as illustrated in FIG. 3. This semantic network generator 41 plays a central role in this particular embodiment. Any input from the network, e.g. when a new electronic document is to be registered, is received via an input 42. The semantic network generator 41 processes the input and generates a semantic network comprising information that represents the content of the document to be registered. This semantic network is maintained/stored in a page content unit 44. Any user input is received via an input 43. The user input is also transformed into a semantic network. This semantic network is maintained/stored in a user specification unit 45. For the retrieval of information, the semantic network generator 41 compares the information in the user specification unit 45 with information in the page content unit 44. Since both information is stored in the same semantic network format, the comparison can be performed using an algorithm that identifies similar structures in both semantic networks. The result of the comparison can be made available at an output 46 for further processing. In another implementation, the semantic network generator 41 generates a subnet for further processing comprising those parts of the semantic network in the page content unit 44 for which matching information was found in the user specification unit 45.

The network in the page content unit 44 may be a dynamic semantic network that changes like a living object whenever the content of an electronic document changes, or when a new electronic document is added. If new information is added, the semantic network is enriched by linking additional objects. Information is removed by disconnecting or deleting objects.

Details about a semantic network generator are given in EP 962873-A1. The semantic network generator creates a semantic network that has a fractal hierarchical structure and comprises semantical units and pointers. The semantic networks used in connection with the embodiment of FIG. 3 can be self-organizing semantic networks. Such self-organizing semantic networks are described in WO 9963455 and in DE 19908204. A semantic network generator similar to those disclosed in the above-mentioned patent application EP 962873-A1, can be employed to generate these semantic networks.

According to another embodiment of the present invention, the page filter system 20 may comprise an interface that allows network managers, content providers or other persons to view the content of those documents that are registered with the page filter system 20. This feature may be limited to electronic documents for which a person is responsible.

Several page filter systems 20 may be distributed across the network. Local copies may exist inside an Intranet. Automated updating of the various copies of the page filter systems 20 is used to ensure that all page filter systems 20 are up-to-date. It is conceivable that there are special-purpose page filter systems 20, e.g., a first one for scientific and technical information, a second one for legal information, and so forth. Typically, a page filter system 20 would co-reside on a web server which serves a particular site.

The user's computer system, e.g., the computer system 34, may have a special application software, e.g., as part of the browser, that handles the creation and/or maintenance of the user specification 22. This special application software may be realized such that it automatically accesses the most appropriate page filter system 20 depending on the current user specification 22. If the user is looking for scientific information, then the special application software will access only the page filter system 20 that maintains the electronic documents 27 with scientific content (pre-selection).

The present invention allows to realize systems where the site management is done by the page filter system 20 and not by the server 30 anymore. Each user sees the network and the information offered inside the network from a different perspective, since each user has a different user specification 22.

Figure 4:
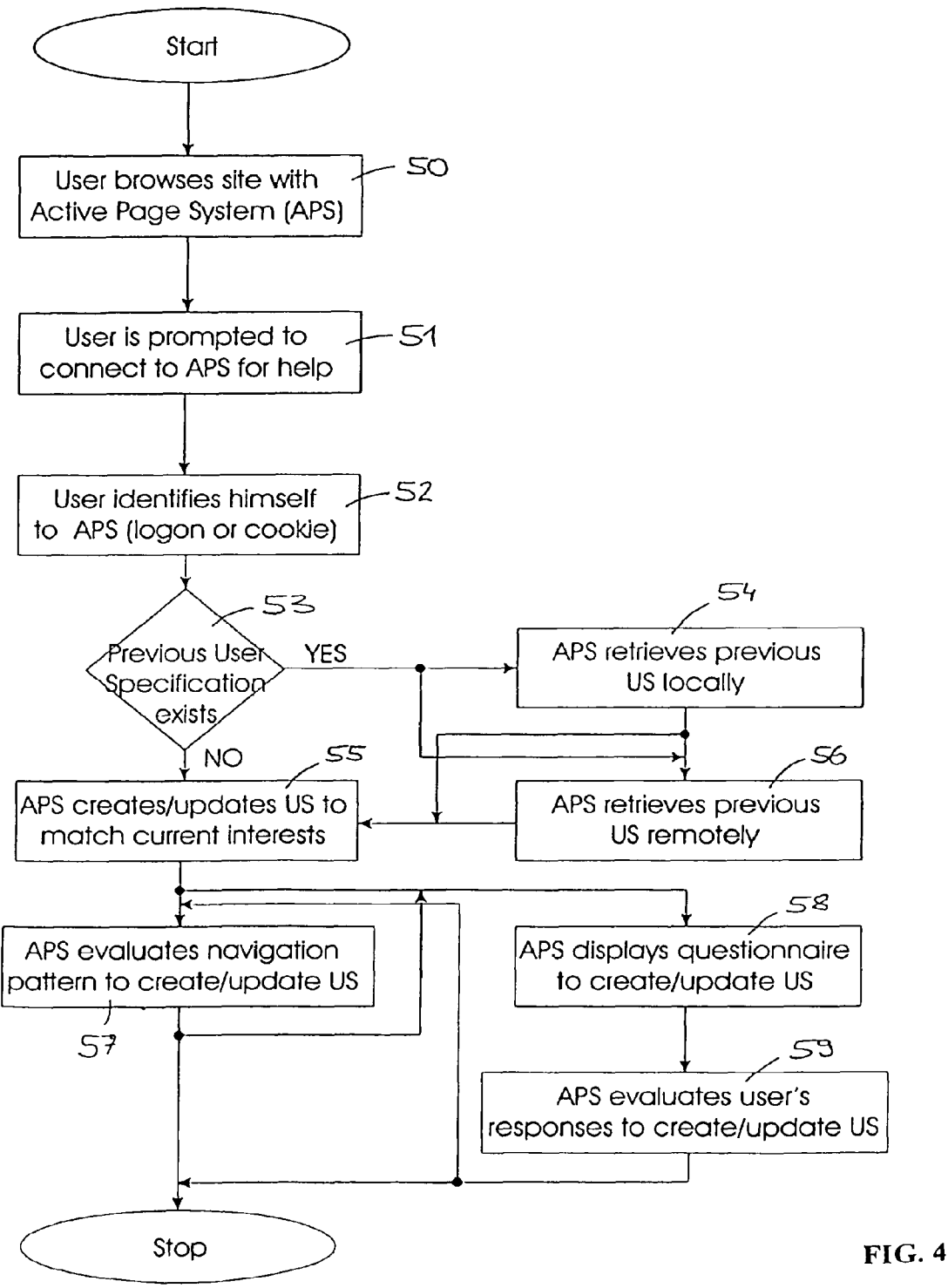
FIG. 4 is a flow chart illustrating a process in accordance with the present invention.

An example for the creation of the user specification 22 is illustrated in the flow chart of FIG. 4. The user who is surfing the network accesses a page filter system (APS) using a browser (step 50). As illustrated in this figure, the user is prompted (step 51) to connect to the APS for help. In the present example, the user identifies himself to the APS (step 52). This can be done by means of a User Identification (UserID), or using cookies, for example. Once the APS has recognized the user, it checks whether a user specification US exists already (step 53). When the user specification exists, the respective specification is retrieved (step 54). If no local user specification exists, a remote user specification may be retrieved (step 56), for example. The user specification may be fetched from another server or from the user's computer, for example. In most cases, the user specification is updated (step 55) in order to make sure that it matches the user's current needs and/or intentions and/or the user's current field of interest. The flow chart of FIG. 4 offers two different options for the updating of the user specification. Option 1:a new user specification is created or an existing user specification is updated using information derived from the user's navigation pattern (step 57). For this reason, the APS may evaluate the user's navigation pattern, e.g. by investigating the previously visited links. Option 2:the APS displays a questionnaire with questions to be answered by the user (step 58). The APS then evaluates the user's responses to the questionnaire in order to create or update the user specification (step 59).

Figure 5:
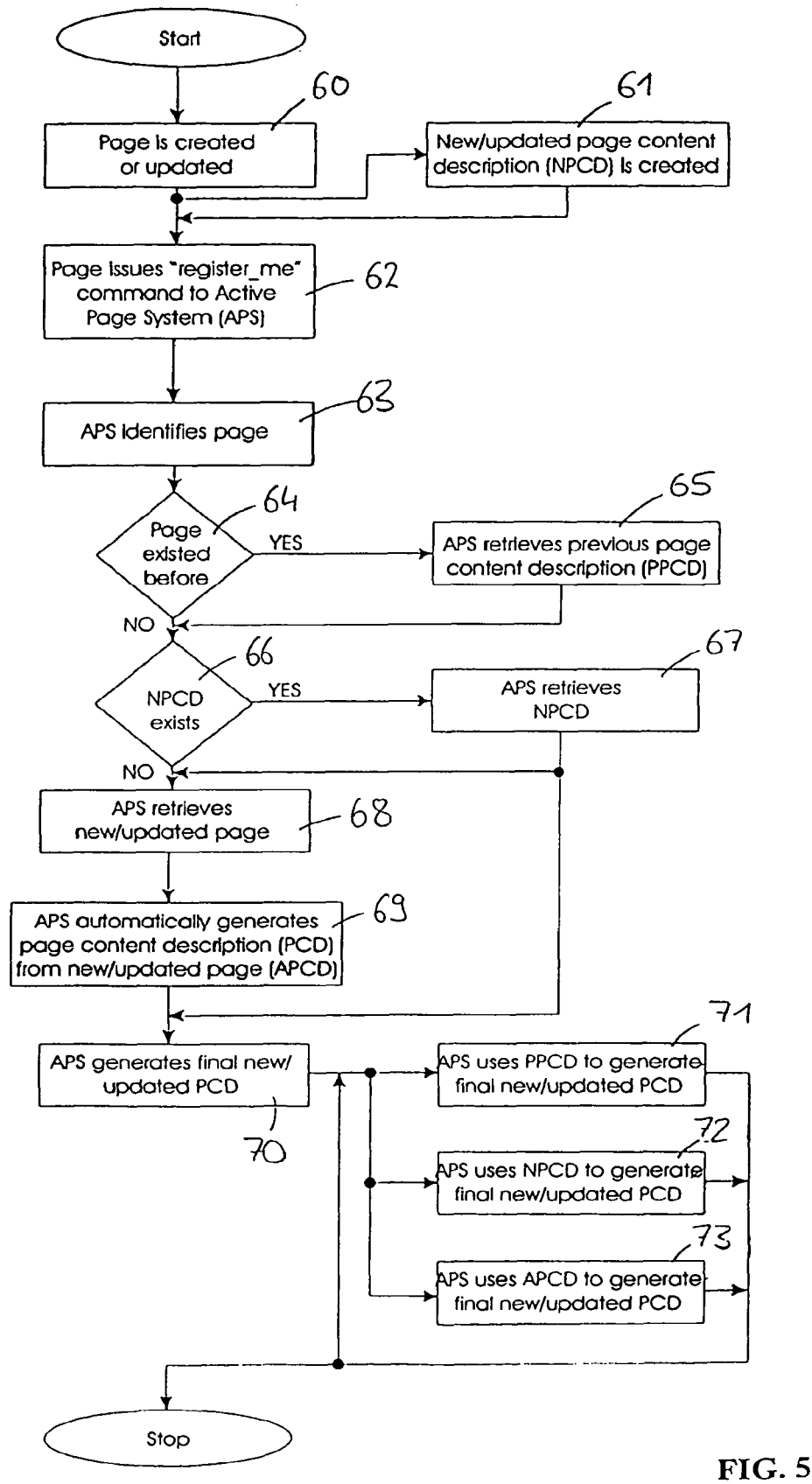
FIG. 5 is a flow chart illustrating another process in accordance with the present invention.

An example for the active registration of an electronic document is illustrated in the flow chart of FIG. 5. The process, according to the present invention, begins when a new page is created or when an existing page is updated (step 60). When a new page is created, a new page content description (NPCD) may be generated (step 61). If an existing page is updated, then the corresponding page content description may be updated, too (step 61). This step 61 is optional. A newly created page or a page that has been modified is registered with the page filter system (APS). This can be done, as illustrated in the flow chart of FIG. 5, by sending a register_me command to the APS (step 62). In a subsequent step 63, the APS identifies the page. Then, the APS checks whether the page existed before (step 64). If the page exists already, the APS retrieves the previous page content description (PPCD) (step 65). In a subsequent step 66, the APS determines whether a new page content description (NPCD) exists. If the answer is yes, the APS retrieves the respective NPCD (step 67). Otherwise, the APS retrieves the new or updated page (step 68) and automatically generates a corresponding page content description (PCD) from the page, as illustrated by box 69. In the present example, the final new or updated PCD is generated (step 70) by using the previous page content description (PPCD) (step 71), and/or by using the new page content description (NPCD) (step 72), and/or by using the automatically generated page content description (APCD) (step 73). The process illustrated in FIG. 5 is a combination of the $1^{st}$ mode of operation and the $2^{nd}$ mode of operation.

Figure 6:
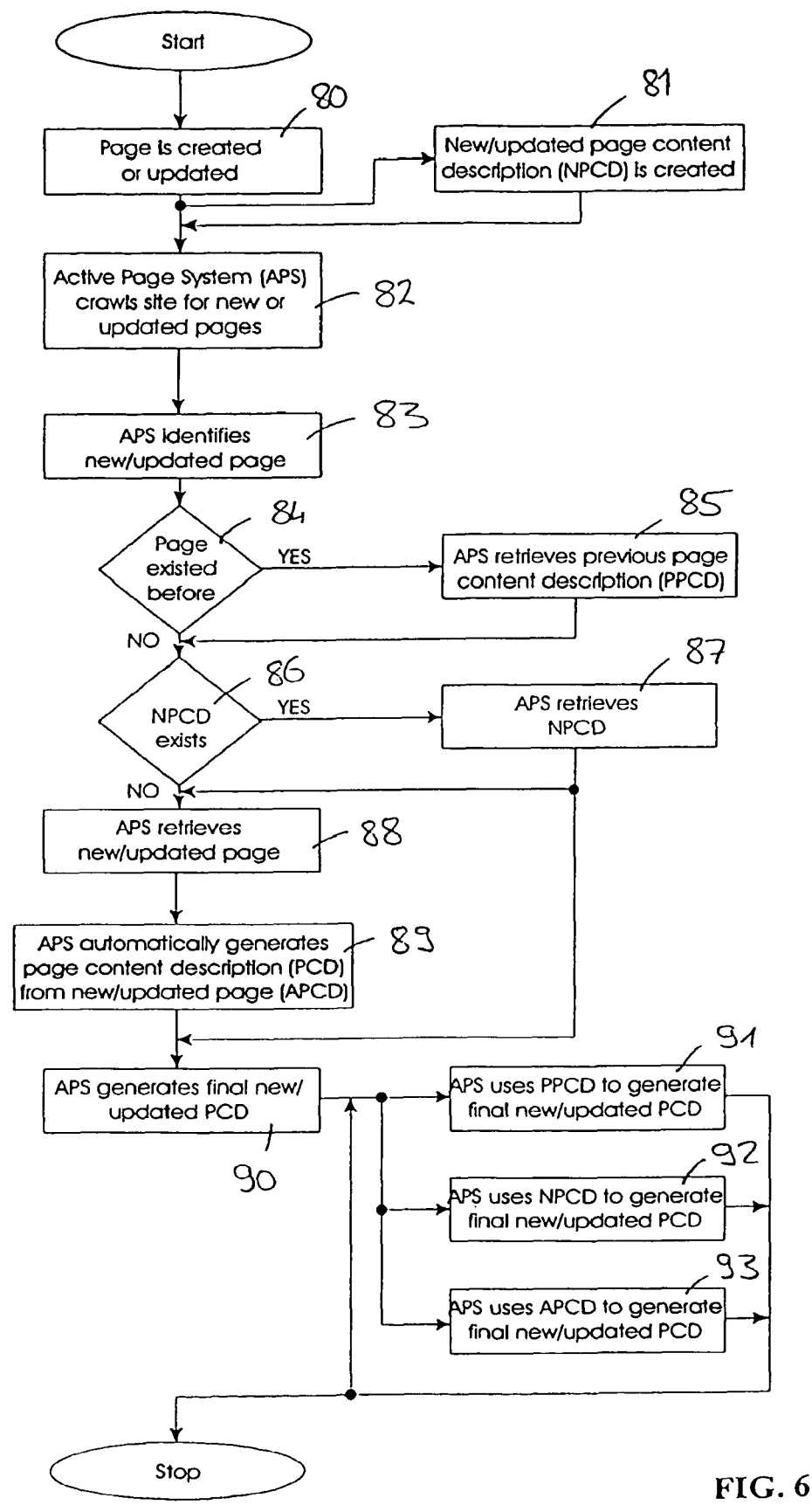
FIG. 6 is a flow chart illustrating another process in accordance with the present invention.

An example for the passive registration of an electronic document is illustrated in the flow chart of FIG. 6. The process, according to the present invention, begins when a new page is created or when an existing page is updated (step 80). When a new page is created, a new page content description (NPCD) may be generated (step 81). If an existing page is updated, then the corresponding page content description may be updated, too (step 81). This step 81 is optional. In the present mode of operation, the page filter system (APS) crawls the network for new or updated pages (step 82). After the APS has identified a new or updated page (step 83), the APS checks whether this page existed before (step 84). The subsequent steps 84-93 are the same as the steps 64-73 illustrated in FIG. 5. If the page exists already, the APS retrieves the previous page content description (PPCD) (step 85). In a subsequent step 86, the APS determines whether a new page content description (NPCD) exists. If the answer is yes, the APS retrieves the respective NPCD (step 87). Otherwise, the APS retrieves the new or updated page (step 88) and automatically generates a corresponding page content description (PCD) from the page, as illustrated by box 89. In the present example, the final new or updated PCD is generated (step 90) by using the previous page content description (PPCD) (step 91), and/or by using the new page content description (NPCD) (step 92), and/or by using the automatically generated page content description (APCD) (step 93).

Figure 7:
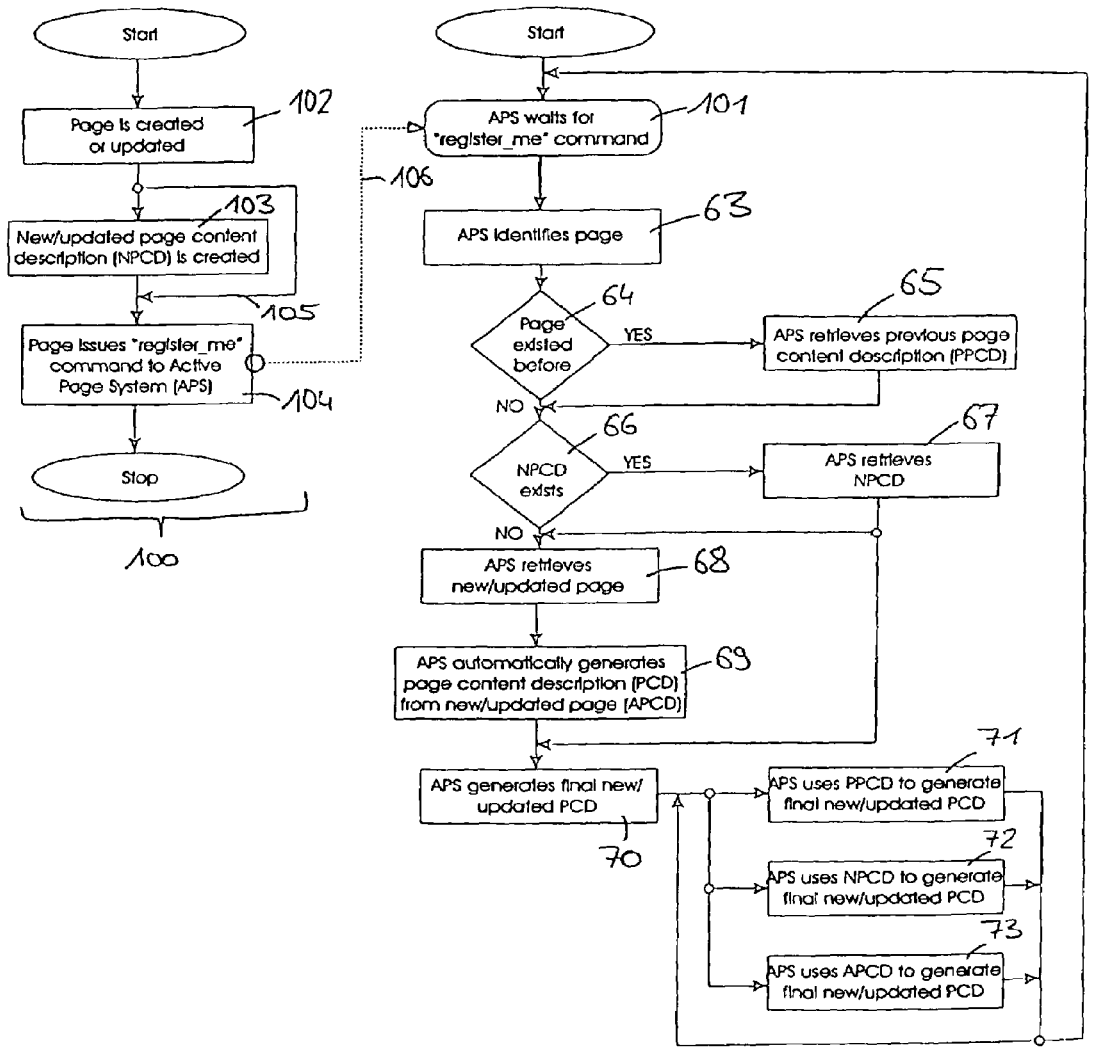
FIG. 7 is a flow chart illustrating another process in accordance with the present invention.

Yet another process, according to the present invention, is illustrated in FIG. 7. The steps 63-73 of the flow chart on the right hand side of FIG. 7 are the same as in FIG. 5. The major difference of the process of FIG. 7 and the process of FIG. 5 is that the page filter system (APS) is in a mode where it waits for a register_me command (step 101). The creation or updating of a page is in the present example an independent process 100, as illustrated on the left hand side of FIG. 7. When a new page or an updated page is created (step 102), a new or updated page content description (NPCD) may generated (step 103) and a register_me command together with this NPCD may be sent to the APS (step 104). Instead of generating an NPCD and sending this NPCD to the APS, the page content may be sent to the APS for processing by the APS, as illustrated by means of the arrow 105 that by-passes step 103.

After the APS has received a register_me command via connection 106, the some or all of the steps 63-73 are performed.

Figure 8A:
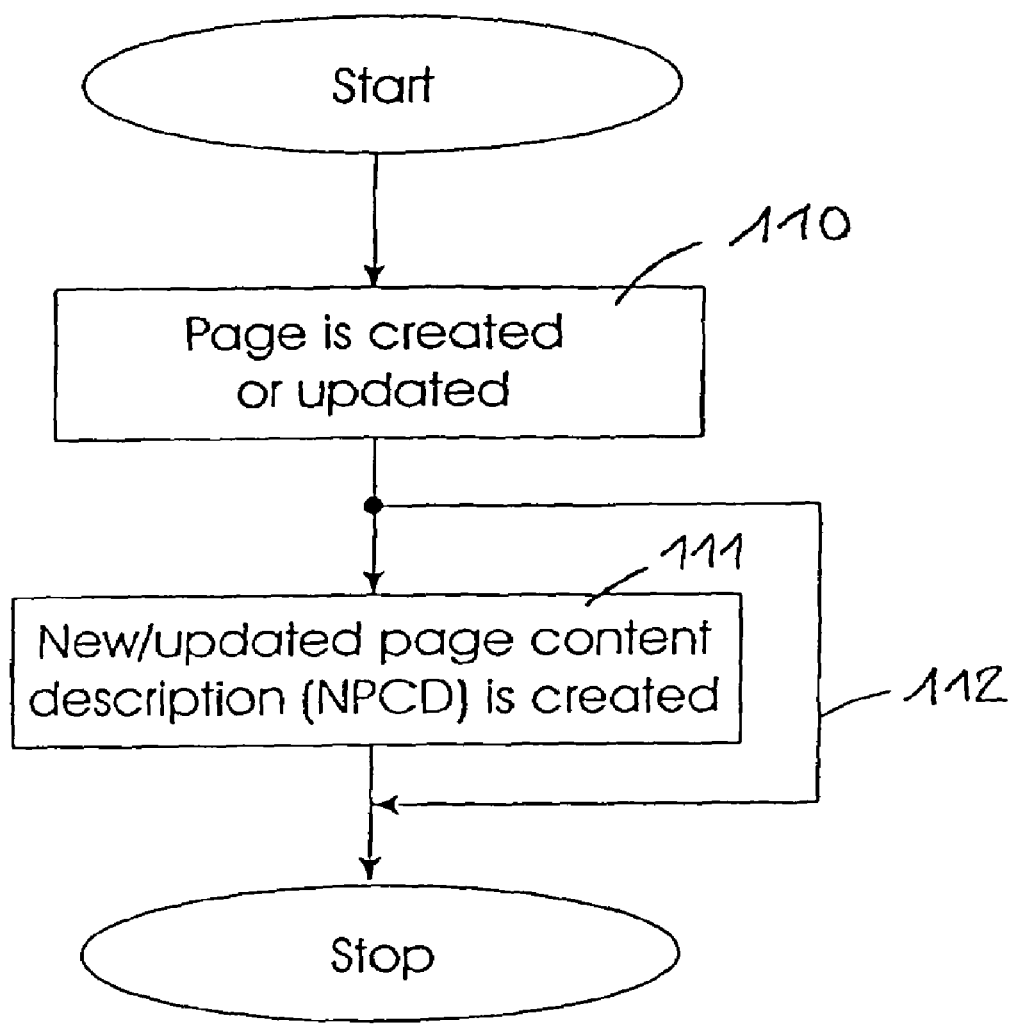
FIG. 8A is a flow chart illustrating another process in accordance with the present invention.
Figure 8B:
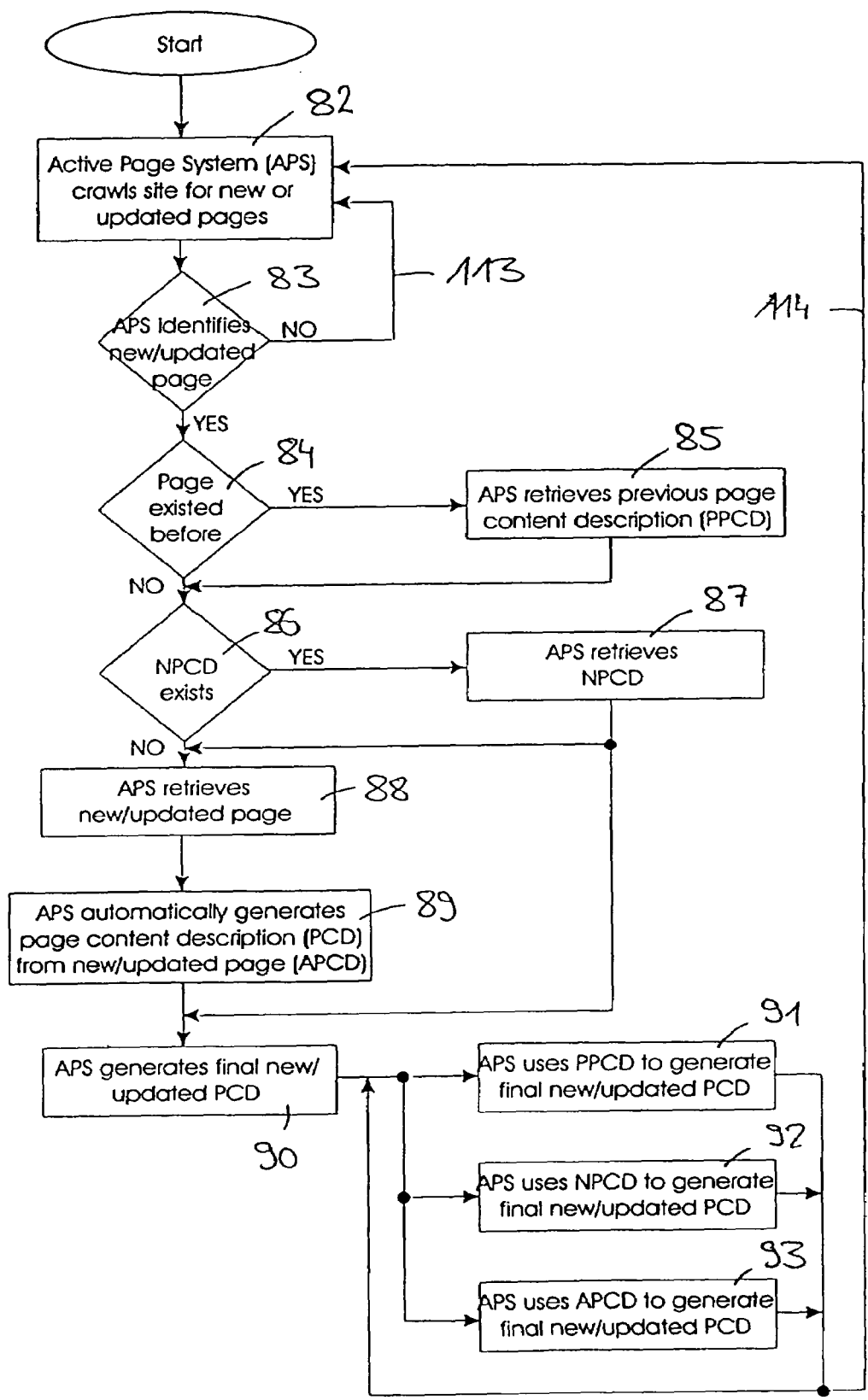
FIG. 8B is a flow chart illustrating another process in accordance with the present invention.

Another process is illustrated in FIGS. 8A and 8B. When a new page or an updated page is created (step 110), a new or updated page content description (NPCD) may generated (step 111), as depicted in FIG. 8A. Instead of generating an NPCD, the page content may be fetched and processed by the APS, as illustrated by means of the arrow 112 that by-passes step 111. The steps 82-93 of the flow chart of FIG. 8B are similar to the steps of FIG. 6. The major difference of the process of FIG. 8B and the process of FIG. 6 is that the page filter system (APS) crawls a (remote) site for new or updated pages (step 82). The APS may either constantly crawl for new or updated pages or it may initiate the crawling process from time-to-time to look for new or updated pages. The process of FIG. 8A and the process of FIG. 8B are independent. If the APS does not find any new or updated page, the process returns via the arrow 113 to step 82. At the end of the process of FIG. 8B, the APS returns to step 114.

The processes illustrated in FIGS. 4 through 8A and 8B can be modified or adapted depending on the actual needs.

According to one embodiment, pages that are registered with a page filter system cancel or withdraw their registration. If the administrator of a server decides that a page is outdated or not needed anymore, he can have the page removed from the page filter system(s). The administrator or server has full control over the page.

The invention presented herein can come in a variety of implementations, as illustrated by means of the above-described examples and embodiments.

The invention claimed is:

1. A computer program product stored in a computer-readable storage medium for presenting to a user electronic documents that are stored at one or more network sites which are accessible via a network by a computer system, comprising:
    a) first instructions for registering said electronic documents with a page filter system of the computer system by generating a first semantic network comprising information that represents content of the electronic documents to be registered;
    b) second instructions for determining needs, intentions and a field of interest of said user;
    c) third instructions for defining, by the computer system, a user specification wherein information of said determined needs, intentions and a field of interest of said user is transformed into a second semantic network, wherein the user specification is defined by using user information that is gained by the following processes using the page filter system:
        receiving from the user a specification of the needs, intentions and the field of interest of said user,
        recording accesses said user has performed,
        recording a personal history by means of a browser software, and
        recording at least one of browsing behavior of said user, click streams, explicit queries, and key word lists;
    d) fourth instructions for determining by comparison of the information in the first and second semantic network a subset of said electronic documents comprising only those of said electronic documents which comprise content that has a predetermined relation to said user specification, wherein the fourth instructions comprises instructions for identifying the subset of the electronic documents by seeking matches between the content of said electronic documents and the user specification; and
    e) fifth instructions for using said subset of said electronic documents to amend the presentation of at least one of said electronic documents to said user, wherein the fifth instructions comprises:
        instructions for generating a dynamic site map from said subset of said electronic documents, wherein said dynamic site map comprises links to said subset of said electronic documents; and
        instructions for using said links to access said subset of said electronic documents.

2. The computer program product of claim 1, further comprising:
    instructions for receiving the electronic documents at the page filter system for registration.

3. The computer program product of claim 1, further comprising:
    instructions for extracting and storing information concerning the content of the electronic documents in the page filter system.

4. The computer program product of claim 1, further comprising:
    instructions for searching the network to find the electronic documents for registration.

5. The computer program product of claim 4, wherein the first instructions comprises instructions for registering those electronic documents that were found by the searching.

6. The computer program product of claim 1, wherein the first instructions is initiated in response to receiving a command to register said electronic documents and wherein the command is received from a data processing system on which said electronic documents are stored.

7. The computer program product of claim 1, further comprising:
    instructions for automatically modifying the dynamic site map in response to a change in at least one of said content of said electronic documents, an addition of a further electronic document to be registered, or a change in said user specification.

8. A system, comprising:
    a memory storing program code; and
    a processor for executing the program code to present to a user electronic documents that are stored at one or more network sites which are accessible via a network by a computer system, the processor executing the program code to:
    a) register said electronic documents with a page filter system of the computer system by generating a first semantic network comprising information that represents content of the electronic documents to be registered;
    b) determine needs, intentions and a field of interest of said user;
    c) define, by the computer system, a user specification wherein information of said determined needs, intentions and a field of interest of said user is transformed into a second semantic network, wherein the user specification is defined by using user information that is gained by the following processes using the page filter system:
        receive from the user a specification of the needs, intentions and field of interest of said user,
        record accesses said user has performed,
        record a personal history by means of a browser software, and
        record at least one of browsing behavior of said user, click streams, explicit queries, and key word lists, d) determine by comparison of the information in the first and second semantic network a subset of said electronic documents comprising only those of said electronic documents which comprise content that has a predetermined relation to said user specification, wherein determine the subset of said electronic documents comprises identify the subset of the electronic documents by seeking matches between the content of said electronic documents and the user specification; and e) use said subset of said electronic documents to amend the presentation of at least one of said electronic documents to said user, wherein use of said subset of said electronic documents to amend the presentation of at least one of said electronic documents to said user comprises:
  generate a dynamic site map from said subset of said electronic documents, wherein said dynamic site map comprises links to said subset of said electronic documents; and
  use said links to access said subset of said electronic documents.

9. The system of claim 8, wherein the processor further executes the program code to receive the electronic documents at the page filter system for registration.

10. The system of claim 8, wherein the processor further executes the program code to extract and store information concerning the content of the electronic documents in the page filter system.

11. The system of claim 8, wherein the processor further executes the program code to search the network to find the electronic documents for registration.

12. The system of claim 11, wherein the processor executing the program code to register said electronic documents with a page filter system of the computer system comprises the processor executing the program code to register those electronic documents that were found by the searching.

13. The system of claim 8, the processor executing the program code to register said electronic documents with a page filter system of the computer system is initiated in response to receiving a command to register said electronic documents and wherein the command is received from a data processing system on which said electronic documents are stored.

14. The system of claim 8, wherein the processor further executes the program code to automatically modify the dynamic site map in response to a change in at least one of said content of said electronic documents, an addition of a further electronic document to be registered, or a change in said user specification.

* * * * *